United States Patent [19]

Hederich et al.

[11] 4,222,947

[45] Sep. 16, 1980

[54] ANTHRACHINONE DYESTUFFS

[75] Inventors: Volker Hederich, Cologne; Winfried Kruckenberg; Karl H. Schündehütte, both of Leverkusen, all of Fed. Rep. of Germany

[73] Assignee: Bayer Aktiengesellschaft, Leverkusen, Fed. Rep. of Germany

[21] Appl. No.: 12,291

[22] Filed: Feb. 15, 1979

[30] Foreign Application Priority Data

Feb. 17, 1978 [DE] Fed. Rep. of Germany ....... 2806733

[51] Int. Cl.$^2$ ...................... C07C 97/26; C09B 1/514
[52] U.S. Cl. ................................... 260/380
[58] Field of Search ............... 260/380, 383, 379, 381, 260/326 C, 325 PH

[56] References Cited

U.S. PATENT DOCUMENTS

| | | | |
|---|---|---|---|
| 2,391,011 | 12/1945 | Dickey et al. | 260/380 |
| 2,517,935 | 8/1950 | Hayhurst et al. | 260/380 |
| 2,726,251 | 12/1955 | Dickey et al. | 260/380 |
| 2,844,598 | 7/1958 | Basel et al. | 260/380 |
| 2,933,508 | 8/1960 | Lodge et al. | 260/380 |
| 3,689,510 | 9/1972 | Kölliker et al. | 260/326 C |
| 3,900,496 | 8/1975 | Kölliker et al. | 260/326 C |
| 3,963,763 | 6/1976 | Hederich et al. | 260/380 |
| 4,006,163 | 2/1977 | Kölliker et al. | 260/325 PH |
| 4,036,862 | 8/1977 | Hederich et al. | 260/380 |

Primary Examiner—Winston A. Douglas
Assistant Examiner—Raymond K. Covington

Attorney, Agent, or Firm—Sprung, Felfe, Horn, Lynch & Kramer

[57] ABSTRACT

Dyestuffs, which are free from nitro groups and sulphonic acid groups, of the formula $$F-Z-(OA)_n-OR \qquad I$$

wherein
F denotes an anthraquinone nucleus which contains at least one auxochromic group in the α-position,
Z denotes a direct bond or a bridge member,
A denotes alkylene,
R denotes alkyl, aralkyl, cycloalkyl, aryl or acyl and
n denotes 3 to 8, with the proviso that R does not represent aralkyl if n denotes the number 3 and the number of the auxochromic groups is two, have a melting point below 140° C., in particular below 100° C., and are outstandingly suitable for dyeing and printing synthetic fibre materials, in particular those of polyesters, on which they produce dyeings with good fastness to sublimation, washing and light.

The dyestuffs are advantageously employed in the form of liquid or pulverulent preparations which contain, in addition to the dyestuff, emulsifying polar/non-polar compounds and, if appropriate, formulating agents and extenders.

These preparations are distinguished by very high solubility in cold water and require no further dyeing auxiliaries such as, for example, carriers.

4 Claims, No Drawings

ANTHRACHINONE DYESTUFFS

The invention relates to dyestuffs, which are free from nitro groups and sulphonic acid groups, of the formula $$F-Z-(OA)_n-OR \qquad I$$

wherein
 F denotes an anthraquinone nucleus which contains at least one auxochromic group in the α-position,
 Z denotes a direct bond or a bridge member, which can optionally be cyclised with an adjacent position in F,
 A denotes an alkylene radical,
 R denotes an alkyl, aralkyl, cycloalkyl, aryl or acyl radical and
 n denotes an integer between 3 and 8,
it being possible for the radicals F, Z, A and R optionally to contain further non-ionic substituents which are customary in dyestuff chemistry, with the proviso that R represents alkyl, cycloalkyl, aryl or acyl and n denotes numbers from 4 to 8 if Z is a direct bond or a NH—arylene radical and at the same time the number of the auxochromic groups in the α-position of F is two.

The invention further relates to mixtures which consist of at least 2 dyestuffs of the formula I wherein n denotes a number between 2 and 8, preferably 3 and 5, and which differ from one another at least with respect to the number n.

On average, these mixtures contain at least 10 percent by weight of an individual component.

Suitable bridge members Z are: —O—alkylene—, —S—alkylene—, —NH—alkylene—, —arylene—, —O—arylene—, —NH—arylene—,

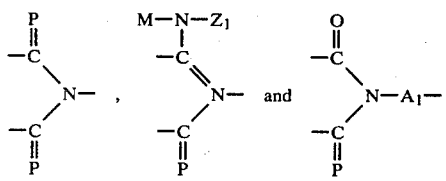

wherein
 $A_1$ represents $C_2-C_6$-alkylene,
 P represents O or NH,
 M represents H or alkyl and
 $Z_1$ represents alkyl or aryl,
and the abovementioned radicals are to be read only in one direction, namely from left to right.

Suitable auxochromic groups, which can appear in all four α-positions, are, in addition to a group $Z-(OA)_n-OR$ itself, OH, $NH_2$, alkylamino, cycloalkylamino, aralkylamino, arylamino, acylamino, alkoxy, aryloxy, alkylmercapto, arylmercapto, alkylsulphonyl and arylsulphonyl.

Suitable alkylamino radicals in F are, in particular, those with 1-6 carbon atoms, which can optionally be substituted by $C_1-C_4$-alkoxy groups.

Suitable cycloalkylamino groups are, in particular, cyclohexylamino radicals which are optionally substituted by $C_1-C_4$-alkyl radicals.

Suitable arylamino radicals are preferably phenylamino radicals, which can be substituted by halogen atoms, such as chlorine or bromine, or by $C_1-C_8$-alkyl, $C_1-C_4$-alkoxy, $C_1-C_4$-alkylmercapto, trifluoromethyl, acetylamino, phenyl or phenoxy groups, and the naphthylamino radical.

Suitable acylamino groups are those of the formula $$-NH-Q-T$$

in which Q represents a —CO—, —$CO_2$— or —$SO_2$— bridge and T denotes a $C_1-C_{17}$-alkyl radical which is optionally substituted, for example by chlorine, cyano, hydroxyl, phenoxy or $C_1-C_4$-alkoxy, a cycloalkyl radical or a phenyl radical which is optionally substituted by halogen, such as chlorine or bromine, $C_1-C_4$-alkyl, $C_1-C_4$-alkoxy or $C_1-C_4$-alkylmercapto.

Suitable alkoxy groups are those with 1-6 carbon atoms, and suitable aryloxy groups are preferably phenoxy groups, which can be substituted by halogen or $C_1-C_8$-alkyl or $C_1-C_4$-alkoxy groups. Suitable alkylmercapto groups are those with 1-6 carbon atoms, and suitable arylmercapto groups are preferably phenylmercapto groups, which can be substituted by halogen or $C_1-C_8$-alkyl groups. Suitable alkylsulphonyl groups are those with 1-6 carbon atoms in the alkyl radical, and suitable arylsulphonyl groups are, in particular, benzenesulphonyl groups, which can optionally be substituted by chlorine or $C_1-C_4$-alkyl groups.

Suitable further substituents which the anthraquinone nucleus F can carry are halogen atoms, preferably 1 to 2 chlorine atoms or bromine atoms, or the methyl group.

Possible alkylene radicals in A and Z are straight-chain or branched $C_2-C_6$-hydrocarbon radicals, preferably the radical $C_2H_4$.

Suitable arylene radicals in Z are, in particular, phenylene radicals, which can optionally be substituted by halogen, such as chlorine or bromine, or by the $C_1-C_6$-alkyl, cycloalkyl, benzyl, phenyl, $C_1-C_4$-alkoxy or phenoxy group, and furthermore the naphthylene radical.

Suitable radicals R are $C_1-C_6$-alkyl radicals which are optionally substituted by hydroxyl, $C_1-C_4$-alkoxy groups, phenoxy or cyano, such as, for example, the methyl, ethyl, propyl, isopropyl, n-butyl, iso-butyl, sec.-butyl, pentyl, n-hexyl, γ-hydroxypropyl, β-methoxyethyl, β-ethoxyethyl, 3-methoxybutyl, β-cyanoethyl or phenoxyethyl radical. Aralkyl radicals R which may be mentioned are: the benzyl, methylbenzyl, chlorobenzyl or β-phenylethyl radical; cycloalkyl radicals R which may be mentioned are: the cyclohexyl or methylcyclohexyl radical; and preferred aryl radicals R which may be mentioned are: the phenyl radical, which can be substituted by one to two halogen atoms, such as fluorine, chlorine or bromine, by hydroxyl, by trifluoromethyl, $C_1-C_4$-alkoxy or alkylmercapto or $C_1-C_4$-alkyl radicals or by phenyl or phenoxy. Suitable acyl radicals R have the formula —Q—T. Acyl radicals R which may be mentioned are: the acetyl, propionyl, butyryl, methoxyacetyl, ethoxyacetyl, phenoxyacetyl, phenylacetyl, methoxy- or ethoxy-carbonyl, methane- or ethane-sulphonyl, or benzenesulphonyl, toluenesulphonyl, chlorobenzenesulphonyl or methoxybenzenesulphonyl radical.

Preferred dyestuffs of the formula I are those of the formula

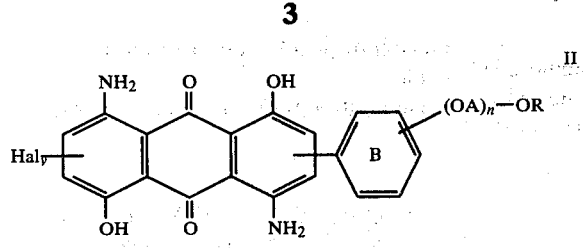

in which
- the ring B represents a phenyl radical which is optionally monosubstituted or disubstituted by chlorine, bromine or $C_1$–$C_4$-alkyl,
- Hal represents chlorine or bromine,
- v represents a number between 0 and 2 and
- n, A and R have the meaning indicated, it being possible for the radicals A and R to be optionally substituted as described above, and mixtures thereof of the type indicated above, and, in particular, those dyestuffs which correspond to the formula

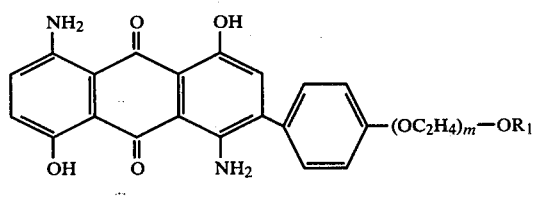

in which
- $R_1$ represents a $C_1$–$C_6$-alkyl radical which is optionally substituted by a $C_1$–$C_4$-alkoxy group and
- m represents a number between 3 and 5, and mixtures thereof of the type indicated above.

Preferred dyestuffs of the formula I are furthermore those of the formula

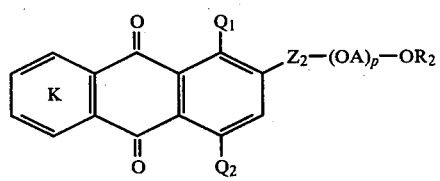

in which
- $Q_1$ and $Q_2$ represent an amino and/or hydroxyl group,
- $Z_2$ denotes a direct bond or an O—alkylene, S—alkylene, NH—alkylene, O—arylene or NH—arylene radical,
- $R_2$ denotes an alkyl, cycloalkyl, aryl or acyl radical,
- p denotes a number between 3 and 8 and the ring K can be substituted by halogen, such as fluorine or chlorine, and in which
- A has the meaning indicated and
- the radicals $Z_2$ and $R_2$ are optionally substituted, with the proviso that if $Z_2$ is a direct bond, p represents a number between 4 and 8, and mixtures thereof of the type indicated.

Of these, particularly preferred dyestuffs are in turn those of the formulae

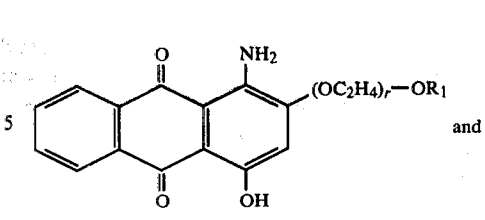

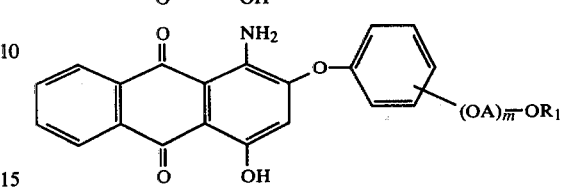

in which
- r represents a number between 4 and 8 and
- A, m and $R_1$ have the meaning indicated, and mixtures thereof of the type indicated.

Further preferred dyestuffs are those of the formula

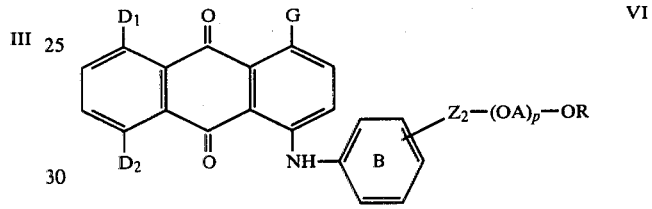

in which
- B, $Z_2$, A, R and p have the meaning indicated, and in which
- $D_1$ and $D_2$ represent hydrogen, chlorine, hydroxyl, amino, acylamino or the radical

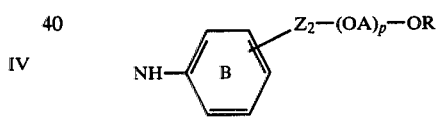

and
- G represents hydroxyl or the radical

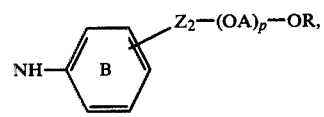

with the proviso that the radical

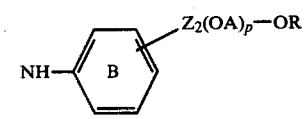

can occur at most twice in the molecule and that when two auxochromic α-groups are present and if $Z_2$ is a direct bond, p represents a number between 4 and 8, and mixtures thereof of the type indicated.

Of these dyestuffs, particularly preferred dyestuffs are those of the formula

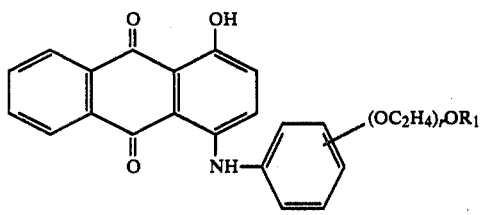    VII

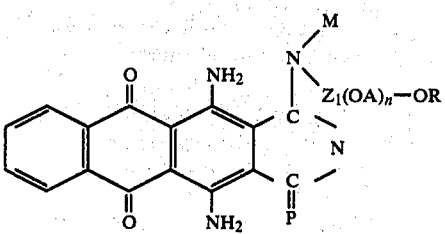    XI in which $R_1$ and r have the meaning indicated, and mixtures thereof of the type indicated.

Dyestuffs of the formula I which are also preferred are those dyestuffs of the formula

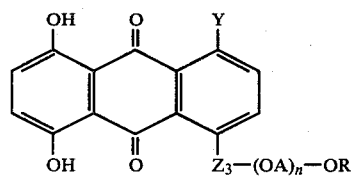    VIII in which A, M, P, R, $Z_1$ and n have the meaning indicated, it being possible for these radicals to be substituted in the manner indicated above, and mixtures thereof of the type indicated.

Finally, preferred dyestuffs of the formula I are those of the formula

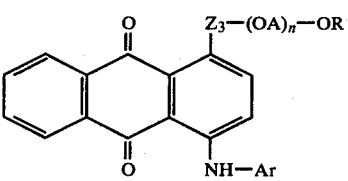    XII in which

A, R and n have the meaning indicated,

Y represents hydroxyl or a radical $Z_3$—$(OA)_n$—OR and $Z_3$ represents NH-alkylene, and mixtures thereof of the type indicated.

Preferred dyestuffs I are also those of the formula

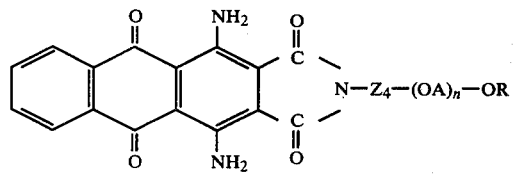    IX in which

A, R and n have the meaning indicated and $Z_4$ denotes a direct bond or an O-alkylene or arylene radical, it being possible for these radicals to be substituted in the manner indicated above, and mixtures thereof, and furthermore those of the formula

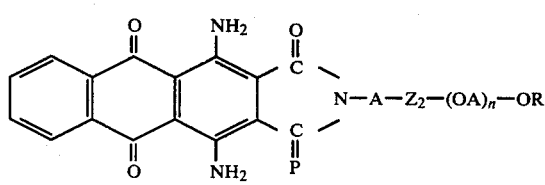    X in which A, R, $Z_2$, P and n have the meaning indicated and the radicals A and R can be substituted in the manner indicated, and mixtures thereof of the type indicated, and those of the formula in which A, R, $Z_3$ and n have the meaing indicated and Ar represents an aryl radical, it being possible for these radicals to be substituted in the manner indicated, and mixtures thereof of the type indicated.

The dyestuffs I according to the invention are obtained by a process in which anthraquinone compounds

F—E    XIII in which

F has the meaning indicated and

E denotes a substituent which can be replaced, are reacted by methods which are in themselves known with compounds $HZ_2$—$(OA)_n$—OR    XIV in which A, R and n have the meaning indicated and $Z_2$ represents a direct bond or —O—alkylene, —S—alkylene—, —NH—alkylene—, —O—arylene or —NH—arylene—, if appropriate in the presence of an organic solvent and preferably in the presence of a condensation agent.

The compounds of the formula XIV are known or are readily accessible by known methods, for example by oxyalkylating compounds of the formula HOA—OR or HOR, subjecting the reaction product to fractional distillation, in which preferably only the lower oxyalkylation products (n=1 and 2) are separated off and the higher derivatives are not further fractionated, appropriately adding on acrylonitrile or replacing the terminal OH group of the particular fractions by reactions with thionyl chloride or methanesulphonyl chloride, if appropriate distilling the mixture again to remove decomposition products, and appropriately reacting the resulting reaction products with phenols or aminophenols by known methods.

Replaceable substituents in XIII which may be mentioned are: halogen, such as chlorine or bromine, aryloxy radicals, such as phenoxy- or p-chlorophenoxy, low molecular alkoxy radicals, such as, in particular, the methoxy radical, and furthermore the nitro, hydroxyl, sulphonic acid, alkylsulphonyloxy or arylsulphonyloxy groups, such as, for example, the toluenesulphonyloxy group.

Examples of suitable condensation agents are boric acid or, in particular, alkaline agents, such as sodium carbonate or bicarbonate or potassium carbonate or bicarbonate, and furthermore sodium acetate or potassium acetate.

The dyestuffs according to the invention are also obtained by a process in which anthraquinone derivatives

   XV in which
F has the meaning indicated and
L represents the radicals —O—, —S—, —NH—, —aryl—O—, —O—aryl—O—, —NH—aryl—O—,

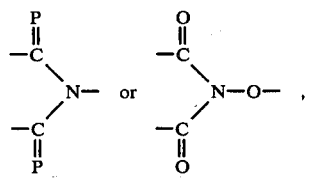

wherein P has the meaning given above, are reacted with compounds

   XVI in which
A, R and n have the meaning indicated and these radicals can be substituted in the manner indicated, and in which
X represents halogen, preferably chlorine, or

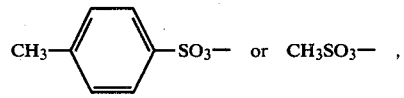

in a manner which is in itself known.

The compounds XVI are readily accessible by known methods in the manner indicated above, by replacing terminal OH groups by the radicals X.

Finally, the dyestuffs I according to the invention are obtained by a process in which anthraquinone dyestuffs

   XVII in which F, A, Z and n have the meaning indicated, are acylated with functional derivatives of aliphatic or aromatic carboxylic acids or sulphonic acids, in particular with acid halides or acid anhydrides, if appropriate in the presence of an inert organic solvent and if appropriate using an acid-binding agent, for example according to the statements of DE-OS (German Published Specification) No. 1,794,115 (British Pat. No. 1,207,867).

In detail, dyestuffs of the formula II are obtained either from 1,5-dihydroxy-4,8-diamino-anthraquinone-2,7-disulphonic acid and corresponding phenol ethers according to the statements of German Patent Specifications Nos. 445,269 (U.S. Pat. No. 1,652,584), 446,563 and 456,235 (British Pat. No. 274,211), or from 1,5-dihydroxy-4,8-dinitro-anthraquinone according to the statements of DE-AS (German Published Specification) No. 1,222,188 (British Pat. No. 1,024,036), or from suitable quinone-imines and phenol ethers according to the statements of DE-AS (German Published Specification) No. 1,228,734, it being possible, if appropriate, for the products then to be post-halogenated according to DE-AS (German Published Specification) No. 1,274,064 (British Pat. No. 1,056,954).

Dyestuffs of the formula III are advantageously obtained by reacting 1,5-dihydroxy-4,8-diamino-3-hydroxyphenyl-anthraquinones with the compound XVI, preferably in the presence of an organic solvent, such as nitrobenzene, o-dichlorobenzene or tetramethylene sulphone, and in the presence of an acid-binding agent, such as sodium carbonate or bicarbonate or potassium carbonate or bicarbonate, at elevated temperatures, preferably at 100°–150° C., in at least stoichiometric amounts, and, after removing the solvent by distillation or steam distillation, isolating the resulting dyestuffs, if appropriate after adding salts, such as sodium sulphate or chloride.

Dyestuffs of the formula IV and, in particular, those of the formula V a are obtained, for example according to the statements of DE-OS (German Published Specification) No. 1,644,621 (U.S. Pat. No. 3,642,835), by a process in which compounds

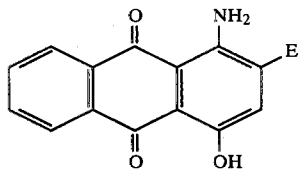   XVIII a in which E denotes a substituent which can be replaced, preferably a phenoxy radical, are reacted with compounds

   XIX the phenol formed, if appropriate, is removed by steam distillation and the resulting dyestuff is isolated, if appropriate by salting out.

Dyestuffs of the formula V b are obtained according to the statements for the preparation of compounds III from suitable 1-amino-4-hydroxy-2-hydroxyphenoxy-anthraquinones and compounds XVI, by etherification in organic solvents, such as nitrobenzene or sulpholane, in the presence of acid-binding agents.

Dyestuffs of the formula VI are obtained, for example, from 1,5-dihydroxy-4,8-dinitro-anthraquinone or from 1,8-dihydroxy-4,5-dinitro-anthraquinone and corresponding arylamines, according to the statements of DE-AS (German Published Specification) No. 1,278,393 (British Pat. No. 1,067,768), or from 1,8-dihydroxy-4,5-dinitro-anthraquinone, according to Belgian Pat. No. 665,161 (U.S. Pat. No. 3,444,215), in the presence of boric acid and with subsequent reduction of the nitro group. They are also obtained according to the statements of Japanese Pat. Nos. 48,103,877 or 4,901,632, by replacing the nitro group in 1,4,5-trihydroxy-8-nitroanthraquinone, or according to DE-AS (German Published Specification) No. 1,191,923 (British Pat. No. 1,292,734) or U.S. Pat. No. 2,543,767 from leuco-quinizarin/quinizarin and corresponding amines, in the presence of condensation agents, such as boric acid, and if appropriate organic solvents, such as ethyl alcohol or butyl alcohol.

Dyestuffs of the formula VII are obtained from anthraquinones

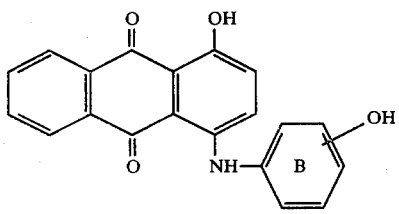

XX and compounds XVI according to the statements for the preparation of III, by reacting the hydroxyl group in the o-, m- or p-position of the arylamine radical with suitable chlorine, bromine or arylsulphonyloxy compounds.

Dyestuffs of the formula VIII were obtained from leuco-tetrahydroxyanthraquinone and corresponding amines or amine mixtures, for example according to Fiat Final Report 1,313, II, 201.

Dyestuffs of the formula IX are prepared according to the statements of DE-OS (German Published Specification) No. 2,357,551 (British Pat. No. 1,441,555) or of U.S. Pat. Nos. 3,835,154 or 3,656,880, or of DE-AS (German Published Specification) No. 1,266,425 (British Pat. No. 1,069,485), using 1,4-diamino-anthraquinone-2,3-dicarboxylic acid anhydride, imide or N-hydroxyimide.

Dyestuffs of the formula X can be prepared according to DE-AS (German Published Specification) No. 1,266,425 (U.S. Pat. No. 3,326,934), and dyestuffs XI can be prepared according to DE-OS (German Published Specification) No. 2,353,700 (U.S. Pat. No. 3,979,413) or DE-AS (German Published Specification) No. 1,073,131 (British Pat. No. 899,709).

The new dyestuffs, which preferably have a melting point below 140° C., in particular below 100° C., are outstandingly suitable for dyeing and printing synthetic fibre materials, in particular those of aromatic polyesters and cellulose esters, on which they produce dyeings with good general fastness properties, in particular good fastness to sublimation, washing and light.

It is particularly advantageous to employ the dyestuffs in the form of liquid or pulverulent preparations which contain, in addition to the dyestuff, emulsifying polar/non-polar compounds and, if appropriate, formulating agents and extenders (in particular inorganic salts, such as NaCl and Na₂SO₄).

These preparations are distinguished by very high solubility in cold water.

In general, a molar ratio of dyestuff to emulsifier of 1:0.1 to 1:4 has proved advantageous; a ratio of 1:1 to 1:3 is preferred, an excess of emulsifier in general not being harmful. However, in practice, a two-fold excess is generally completely adequate.

The production of the dyestuff preparations is not associated with certain prerequisites with respect to appratus. Spray drying, roller drying or drying in Venuleth apparatuses are just as suitable as simple drying on a metal sheet, after combination of the components, in customary kettles, or a combination of adduct formation and drying in the abovementioned apparatuses. It is particularly advantageous to mix the filter press cake, or the oily or pasty dyestuff, such as is obtained direct during the preparation, with the emulsifiers, and if appropriate to convert the mixture into the dry pulverulent form in a known manner. It should be mentioned that no expensive fine-comminution devices, such as bead mills and vibratory mills, need to be employed for any comminution of the dyestuff/emulsifier mixture, but that coarse grinding down to average particle sizes of not less than 50μ is completely adequate.

A summary of suitable emulsifiers can be found in Table 1 of "Tenside Detergents", year 11, 1974, volume 4, page 186.

Preferred polar/non-polar compounds correspond to the general formula $$G_1-L_1 \qquad \text{XXI}$$

wherein
- $G_1$ represents an aliphatic hydrocarbon radical with at least 10 C atoms and
- $L_1$ represents $-SO_3H$, $-O-SO_3H$ or $-OPO_3H_2$, or the corresponding salts.

Examples which may be mentioned are: fatty acid soaps, such as sodium laurate, sodium oleate, sodium linoleate, ammonium ricinoleate, oleic acid esters of sodium isethionate or sodium palmitate, sodium bis(2-ethylhexyl)sulphosuccinate, sodium N-methyl-N-oleyltaurate, β-(tert.-octylphenoxy)-diethyl ether-β'-(Na sulphonate), sodium isododecylbenzenesulphonate, sodium dodecyl-sulphate, sodium N-oleylsulphanilate, dodecyl-phosphonic acid, sodium dodecylbenzimidazolesulphonate, alkoxyarylsulphonates, alkylsulphaminoaryl compounds, dodecylphenolsulphate, dodecylbenzenesulphamic acid, dibutylnaphtholsulphate and dioctylnaphtholsulphate. Cationic surface-active agents which may be mentioned are dodecylamine acetate, dodecylbenzyldimethylammonium chloride and heptadecyl N-aminoethyl-imidazoline-acetate.

Under dyeing or printing conditions, the new dye preparations are in the liquid or dissolved form. The use of additional surface-active agents, such as dispersing agents, protective colloids or levelling agents, or of carriers is therefore superfluous in most cases of dyeing and printing.

In the Examples which follow, "parts" denote parts by weight.

EXAMPLE 1

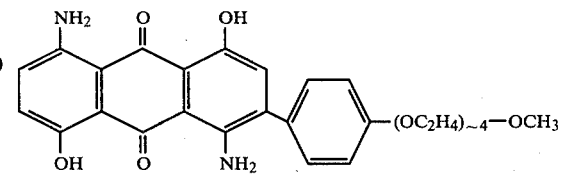

300 Parts of 1,5-dihydroxy-4,8-diamino-3-(4'-hydroxy-phenyl)-anthraquinone are heated to 130° C., together with 90 parts of anhydrous potassium carbonate and 300 parts of a 1-chloro-polyethylene glycol monomethyl ether (average molecular weight 226; prepared from a corresponding methyl-polyethylene glycol mixture of average molecular weight 207 and thionyl chloride), in 1,000 parts by volume of nitrobenzene for 11 hours. The solvent is then removed by steam distillation, the residue is made up to a volume of 4,000 ml with water, the mixture is stirred with 250 parts of sodium sulphate and the precipitate is filtered off, washed with 10% strength sodium sulphate solution and dried at 60° C. in vacuo. About 480 parts of an approximately 90% pure dyestuff mixture which has a melting point of ~100°-30° C. are obtained.

If nitrobenzene in the above example is replaced by the same amount of tetramethylene sulphone, which is removed by vacuum distillation after the reaction has taken place, the same dyestuff mixture is obtained in an analogous manner, as when potassium carbonate is replaced by the equivalent amount of sodium carbonate.

If 1,5-dihydroxy-4,8-diamino-3-(4'-hydroxyphenyl)-anthraquinone is replaced by isomeric 1,5-dihydroxy-4,8-diamino-2-(4'-hydroxyphenyl)-anthraquinone, or mixtures of equal parts of the two isomers are used, analogous dyestuff mixtures are obtained according to the statements of Example 1.

After suitable treatment with sodium sulphate solution and drying, equal parts of the dyestuff mixture obtainable according to Example 1 and sodium lauryl-sulphate were converted into a dyeing preparation which dyes polyester materials, from an aqueous solution, in fast, blue shades.

EXAMPLE 2

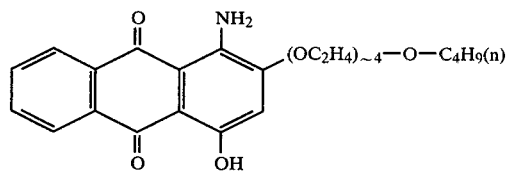

20 Parts of potassium hydroxide are dissolved in 540 parts of a butyl tetraglycol mixture with a hydroxyl number of 221.5 (calculated: 224) at about 130° C. 180 parts of 1-amino-2-phenoxy-4-hydroxy-anthraquinone are then introduced into the melt, and the reaction mixture is stirred at 140° C. for 6 hours. After cooling and adding a mixture of 40 parts by volume of concentrated hydrochloric acid and 60 parts of water, the phenol formed during the trans-etherification is removed by steam distillation. The aqueous distillation residue is then made up to a volume of 4,000 ml with water, the excess acid is buffered by adding 20 parts of sodium acetate and the dyestuff, which has separated out in the form of a liquid, is decanted. After extracting the product phase by stirring with 2,000 ml of 10% strength sodium sulphate solution, the resulting dyestuff is dried at about 60° C. in vacuo. 333 Parts of a dyestuff mixture which is liquid at room temperature are obtained.

280 parts of the dyestuff prepared according to the statements in Example 2 are added to a solution of 280 parts of sodium lauryl-sulphate in 560 parts of water at 80° C. and the mixture is stirred at 80° C. for 1 hour. The mixture is then diluted with 280 parts of water and left to cool to room temperature and a solution of 280 parts of sodium sulphate in about 1,100 ml of water is then added. The entire dyestuff solution is dried in a spray drier. A dyestuff powder which has a solids content of ⅓ each of emulsifier, salt and dyestuff and dyes polyester materials, from an aqueous solution, in brilliant red shades with very good fastness properties is obtained.

EXAMPLE 3

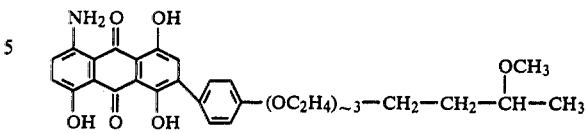

A mixture of 12 parts of 1,5-diamino-4,8-dihydroxy-3-(4'-hydroxy-phenyl)-anthraquinone, 3.6 parts of potassium carbonate and 12 parts of 1-chloro-polyethylene glycol 3'-methoxy-butyl ether were heated to 130° C. in 50 parts by volume of o-dichlorobenzene for 10 hours. After subsequent steam distillation to remove the organic solvent, the residue is extracted by stirring with 20% strength sodium sulphate solution and the product is filtered off, washed with water and dried at 60° C. in vacuo. 19.5 Parts of a dyestuff mixture which has a melting point of about 90° C. and, after appropriate emulsifying, dyes polyester materials, from an aqueous solution, in strong blue shades of outstanding fastness are obtained.

EXAMPLE 4

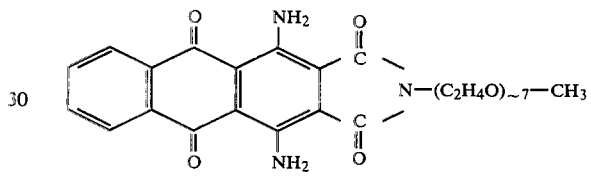

10 Parts of 1,4-diamino-anthraquinone-2,3-dicarboximide are heated to 110°-120° C. in 50 parts by volume of tetramethylene sulphone, with 6 parts of potassium carbonate and 10 parts of a 1-chloro-polyethylene glycol ω-methyl ether of average molecular weight 358 (prepared from a corresponding polyethylene glycol monomethyl ether mixture and thionyl chloride), for 3½ hours. The reaction mixture is then poured into 15–20% strength sodium chloride solution and the dyestuff which has separated out is filtered off. After washing with 20% strength sodium chloride solution and drying at 80° C., 16 parts of an approximately 83% pure dyestuff mixture, which, after appropriate treatment with suitable emulsifiers, dyes polyester materials in blue shades with very good fastness properties, are obtained.

EXAMPLE 5

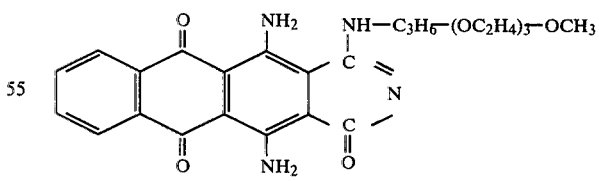

10 Parts of 1-methoxy-3-imino-4,7-diamino-5,6-phthaloyl-isoindolenine are heated to 50°-5° C. with 16 parts of α-aminopropoxy-triethylene glycol ω-methyl ether in 100 parts by volume of methanol for 5 hours. Most of the solvent is then distilled off and the reaction product which has separated out is filtered off. 13.4 Parts of a dyestuff, which, after appropriate conversion into a dyestuff/emulsifier preparation, dyes polyester materials in fast blue shades, are obtained.

EXAMPLE 6

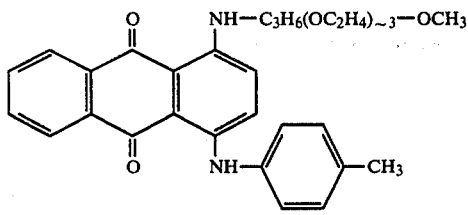

17.1 Parts of 1-methoxy-4-p-toluidino-anthraquinone are heated to 130° C. with 20 parts of a 1-amino-propoxypolyethylene glycol monomethyl ether of average molecular weight 237 in 30 parts by volume of chlorotoluene until the starting material can no longer be detected by chromatography. The solvent is then distilled off in vacuo, the residue is introduced into water and the solid is filtered off. After washing and drying at 50° C. in vacuo, 15.5 parts of a dyestuff mixture which is liquid at room temperature are obtained. It dyes polyester materials a strong greenish-tinged blue of good fastness to sublimation.

EXAMPLE 7

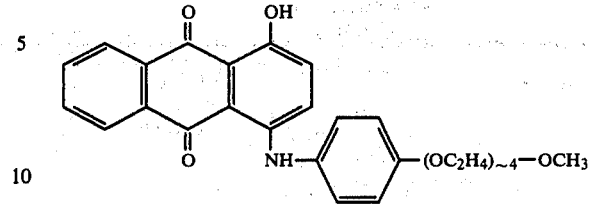

If 12 parts of 1-hydroxy-4-(4'-hydroxyanilino)-anthraquinone, 3.6 parts of potassium carbonate and 15 parts of a 1-chloro-polyethylene glycol monomethyl ether are heated to 140° C. in 60 parts by volume of nitrobenzene for 9 hours, after steam distillation and decanting the product and drying it in vacuo at 70° C., 18.7 parts of a dyestuff mixture, which is liquid at room temperature and, after appropriate emulsifying, dyes polyester material a strong reddish-tinged blue of good fastness properties, are obtained.

If, instead of 1-hydroxy-4-(4'-hydroxyanilino)-anthraquinone, the same amount of the isomeric 3'-hydroxyanilino compound is used as the starting material, 18.6 parts of a dyestuff mixture which dyes polyester bluish-tinged violet are obtained analogously.

EXAMPLE 8–76

If the procedure followed is according to the statements of Examples 1–7, using suitable starting materials, the dyestuffs listed in the table, which produce the indicated colour shades on polyester materials, are obtained.

TABLE I

| Example | Anthraquinonyl radical | Polyether radical | Colour shade on polyester |
|---|---|---|---|
| 8 | ![structure: 1-amino-4-hydroxy-anthraquinone with O- at 2-position] | $-(C_2H_4O)_{\sim 4}-CH_3$ | red |
| 9 | " | $-(C_2H_4O)_{\sim 4}-C_2H_5$ | " |
| 10 | " | $-(C_2H_4O)_4-CH_3$ | " |
| 11 | " | $-(C_2H_4O)_{\sim 6}-CH(CH_3)_2$ | " |
| 12 | " | $-(C_2H_4O)_{\sim 4}-C_6H_5$ | " |
| 13 | " | $-(C_2H_4O)_{\sim 6}-COCH_3$ | " |
| 14 | " | $-(C_2H_4O)_{\sim 5}-COC_2H_5$ | " |
| 15 | " | $-(C_2H_4O)_{\sim 6}-C_4H_9$ | " |
| 16 | ![structure: 1-amino-4-hydroxy-anthraquinone with O-C6H4-O- at 2-position] | $-(C_2H_4O)_4-CH_3$ | pink |
| 17 | " | $-(C_2H_4O)_{\sim 4}-C_4H_9$ | " |
| 18 | " | $-(C_2H_4O)_{\sim 4}-C_2H_3$ | " |
| 19 | " | $-(C_2H_4O)_{\sim 3}-CH_2-CH_2-CH(OCH_3)-CH_3$ | " |
| 20 | " | $-(C_2H_4O)_{\sim 5}-CH(CH_3)_2$ | " |
| 21 | ![structure: 1-amino-4-hydroxy-anthraquinone with O-C6H4-O at 2-position (meta)] | $-(C_2H_4O)_{\sim 4}-CH_3$ | " |

TABLE I-continued

| Example | Anthraquinonyl radical | Polyether radical | Colour shade on polyester |
|---|---|---|---|
| 22 | " | —(C$_2$H$_4$O)$_{\sim 4}$—C$_4$H$_9$ | " |
| 23 | " | —(C$_2$H$_4$O)$_{\sim 6}$—CH$_3$ | " |
| 24 | 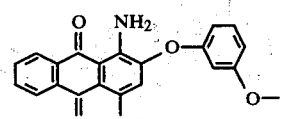 | —(C$_2$H$_4$O)$_{\sim 5}$—CH$_3$ | " |
| 25 | 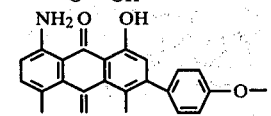 | —(C$_2$H$_4$O)$_{\sim 6}$C$_4$H$_9$(n) | blue |
| 26 | " | —(C$_2$H$_4$O)$_{\sim 4}$—C$_2$H$_5$ | " |
| 27 | " | —(C$_2$H$_4$O)$_{\sim 4}$—CH(CH$_3$)$_2$ | " |
| 28 | " | —(C$_2$H$_4$O)$_{\sim 4}$—COC$_2$H$_3$ | " |
| 29 | " | —(C$_2$H$_4$O)$_4$—CH$_2$—C$_6$H$_5$ | |
| 30 | " | —(C$_2$H$_4$O)$_{\sim 3}$—C$_6$H$_5$ | " |
| 31 | " | —(C$_2$H$_4$O)$_{\sim 5}$—COCH$_3$ | " |
| 32 | " | —(C$_2$H$_4$O)$_3$—CH$_2$CH—CH(OCH$_3$)—CH$_3$ | |
| 33 | 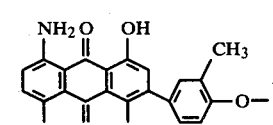 | —(C$_2$H$_4$O)$_{\sim 4}$—CH$_3$ | " |
| 34 | 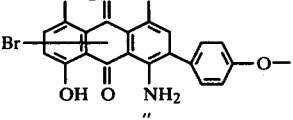 | —(C$_2$H$_4$O)$_{\sim 5}$—CH$_3$ | " |
| 35 | " | —(C$_2$H$_4$O)$_{\sim 4}$—CH(CH$_3$)$_2$ | " |
| 36 | 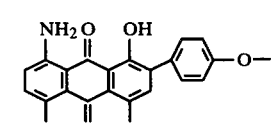 | —(C$_2$H$_4$O)$_{\sim 4}$—CH$_3$ | " |
| 37 | " | —(C$_2$H$_4$O)$_{\sim 3}$—C$_4$H$_9$(n) | " |
| 38 | 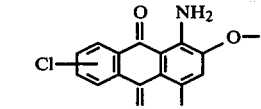 | —(C$_2$H$_4$O)$_{\sim 4}$—C$_4$H$_9$(iso) | pink |
| 39 | 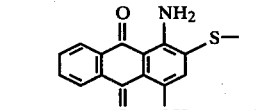 | —(C$_2$H$_4$O)$_{\sim 3}$—C$_3$H$_7$(n) | ruby |
| 40 | " | —(C$_2$H$_4$O)$_{\sim 5}$—C$_4$H$_9$(n) | " |
| 41 | " | —(C$_2$H$_4$O)$_{\sim 6}$—C$_4$H$_9$(n) | " |
| 42 | 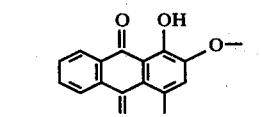 | —(C$_2$H$_4$O)$_4$—CH$_3$ | orange |
| 43 | " | —(C$_2$H$_4$O)$_{\sim 4}$—C$_2$H$_5$ | " |
| 44 | " | —(C$_2$H$_4$O)$_{\sim 5}$—C$_4$H$_9$ | " |

TABLE I-continued

| Example | Anthraquinonyl radical | Polyether radical | Colour shade on polyester |
|---|---|---|---|
| 45 | (anthraquinone with O, OH, S—, OH substituents) | —(C$_2$H$_4$O)$_{\sim 3}$—CH$_2$—C$_6$H$_5$ | scarlet |
| 46 | " | —(C$_2$H$_4$O)$_{\sim 5}$—C$_4$H$_9$(n) | " |
| 47 | (anthraquinone with NH$_2$, O—, NH$_2$ substituents) | —(C$_2$H$_4$O)$_{\sim 5}$—C$_6$H$_4$—CH$_3$ | violet |
| 48 | " | —(C$_2$H$_4$O)$_{\sim 4}$—CO(CH$_2$)$_3$—CH$_3$ | " |
| 49 | (anthraquinone with OH, NH—C$_6$H$_4$—O—, OH substituents) | —(C$_2$H$_4$O)$_4$—C$_4$H$_9$(n) | pink |
| 50 | " | —(C$_2$H$_4$O)$_4$—CH$_3$ | " |
| 51 | (anthraquinone with OH, NHC$_3$H$_6$O—, OH substituents) | —(C$_2$H$_4$O)$_3$—CH$_3$ | red |
| 52 | " | —(C$_2$H$_4$O)$_4$—CH$_3$ | " |
| 53 | (anthraquinone with NH$_2$, O—, OH substituents) | —(C$_2$H$_4$O)$_{\sim 4}$—C$_3$H$_7$(n) | pink |
| 54 | (anthraquinone with OH, OH, OH, NH—C$_6$H$_4$—O— substituents) | —(C$_2$H$_4$O)$_{\sim 4}$—C$_4$H$_9$ | reddish-tinged blue |
| 55 | " | —(C$_2$H$_4$O)$_{\sim 5}$—CH$_3$ | " |
| 56 | (anthraquinone with OH, OH, NH$_2$, NH—C$_6$H$_4$—O— substituents) | —(C$_2$H$_4$O)$_{\sim 4}$—CH$_3$ | blue |
| 57 | " | —(C$_2$H$_4$O)$_{\sim 5}$—CH$_3$ | " |
| 58 | (anthraquinone with OH, OH, H$_{11}$C$_5$CONH, NH—C$_6$H$_4$—O— substituents) | —(C$_2$H$_4$O)$_{\sim 5}$—C$_2$H$_5$ | " |
| 59 | (anthraquinone with NH$_2$, OH, OH, NH—C$_6$H$_4$—O— substituents) | —(C$_2$H$_4$O)$_{\sim 5}$—CH$_3$ | " |
| 60 | (anthraquinone with OH, OH, NH$_2$, NH—C$_6$H$_4$—O— substituents) | —(C$_2$H$_4$O)$_{\sim 4}$—CH$_3$ | " |
| 61 | (anthraquinone with OH, OH, OH, HNC$_3$H$_6$O— substituents) | —(C$_2$H$_4$O)$_{\sim 5}$—CH$_3$ | blue-violet |

TABLE I-continued

| Example | Anthraquinonyl radical | Polyether radical | Colour shade on polyester |
|---|---|---|---|
| 62 | 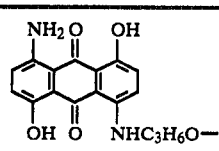 | $-(C_2H_4O)_{\sim 4}-C_4H_9$ | greenish-tinged blue |
| 63 | 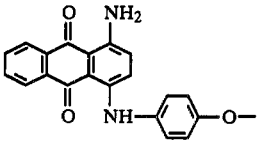 | $-(C_2H_4O)_{\sim 4}-C_5H_{11}(iso)$ | blue |
| 64 | 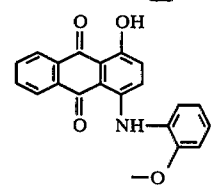 | $-(C_2H_4O)_{\sim 4}-CH_3$ | reddish-tinged blue |
| 65 | 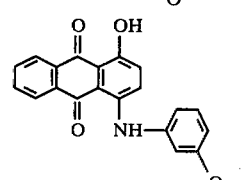 | $-(C_2H_4O)_{\sim 4}-CH_3$ | bluish-tinged violet |
| 66 | 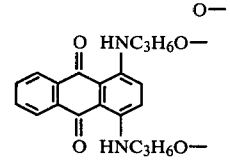 | $-(C_2H_4O)_{\sim 3}-CH_3$<br>$-(C_2H_4O)_{\sim 3}-CH_3$ | blue |
| 67 | 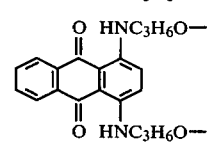 | $-(C_2H_4O)_3-C_4H_9$<br>$-(C_2H_4O)_3-C_4H_9$ | ″ |
| 68 | 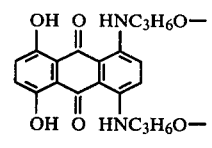 | $-(C_2H_4O)_{\sim 3}-CH_3$<br>$-(C_2H_4O)_{\sim 3}-CH_3$ | blue-green |
| 69 | 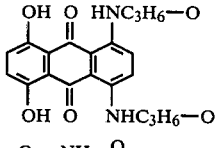 | $-(C_2H_4O)_{\sim 3}-C_4H_9$<br>$-(C_2H_4O)_{\sim 3}-C_4H_9$ | ″ |
| 70 | 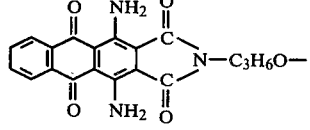 | $-(C_2H_4O)_{\sim 3}-CH_3$ | turquoise blue |
| 71 | 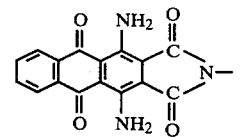 | $-(C_2H_4O)_{\sim 4}CH_2CH_2-\phi$ | ″ |
| 72 | 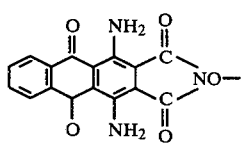 | $-(C_2H_4O)_{\sim 4}-C_3H_7$ | ″ |

TABLE I-continued

| Example | Anthraquinonyl radical | Polyether radical | Colour shade on polyester |
|---|---|---|---|
| 73 | 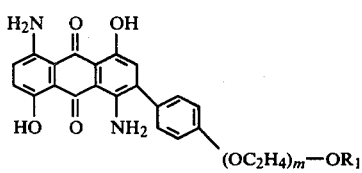 | $-(C_2H_4O)_{\sim 3}-CH_3$ | greenish-tinged blue |
| 74 | " | $-(C_2H_4O)_{\sim 5}-CH_3$ | " |
| 75 | 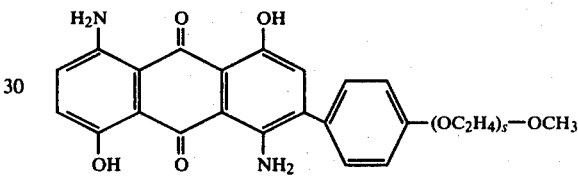 | $-(C_2H_4O)_{\sim 4}-C_4H_9$ | " |
| 76 |  | $-(C_2H_4O)_{\sim 3}-CH_3$ | " |

We claim:

1. Dyestuffs of the formula wherein
 $R_1$ represents a $C_1$-$C_6$-alkyl radical which is optionally substituted by a $C_1$-$C_4$-alkoxy group and
 m represents a number between 3 and 5.

2. Dyestuff mixtures which consist of at least 2 dyestuffs of the formulae indicated in claim 1.

3. Dyestuff according to claim 1, of the formula wherein s denotes the number 4, and mixtures which contain at least 10% of this dyestuff as the constituent with dyestuffs of the same formula but wherein s represents the numbers 2, 3, 5, 6, 7 and/or 8.

4. Dyestuff preparations containing a dyestuff according to claim 1 and an emulsifying compound.